US012710099B2

(12) United States Patent
Apostolou et al.

(10) Patent No.: US 12,710,099 B2
(45) Date of Patent: Aug. 18, 2026

(54) MULTI-FUNCTIONAL VALVE TRAVEL STOP

(71) Applicant: Bray International, Inc., Houston, TX (US)

(72) Inventors: Evan Apostolou, Houston, TX (US); Patrick O'Connell, Houston, TX (US); Parthasarathy Chinnasamy, Houston, TX (US)

(73) Assignee: Bray International, Inc., Houston, TX (US)

( * ) Notice: Subject to any disclaimer, the term of this patent is extended or adjusted under 35 U.S.C. 154(b) by 0 days.

(21) Appl. No.: 18/810,244

(22) Filed: Aug. 20, 2024

(65) Prior Publication Data

US 2025/0067349 A1 Feb. 27, 2025

Related U.S. Application Data

(60) Provisional application No. 63/520,855, filed on Aug. 21, 2023.

(51) Int. Cl.

*F16K 1/52* (2006.01)
*F16K 1/22* (2006.01)
*F16K 27/02* (2006.01)
*F16K 41/02* (2006.01)

(52) U.S. Cl.

CPC .............. *F16K 1/523* (2013.01); *F16K 1/221* (2013.01); *F16K 27/0218* (2013.01); *F16K 41/026* (2013.01)

(58) Field of Classification Search

CPC ...... F16K 1/523; F16K 1/221; F16K 27/0218; F16K 41/026

USPC .................................. 251/286–288, 305–308

See application file for complete search history.

(56) References Cited

U.S. PATENT DOCUMENTS 2,936,778 A 5/1960 Stillwagon
3,192,945 A 7/1965 James
3,250,291 A 5/1966 Roy
5,139,230 A * 8/1992 Lester ................ F16K 31/1635 251/285
5,259,589 A * 11/1993 Posner .................. F16K 5/0647 251/285

(Continued)

OTHER PUBLICATIONS

Crane Chempharma Flow Solutions, Xomox Brands You Trust Xomox Butterfly Valves, 2009, 8 pages, Crane ChemPharma Flow Solutions, Lindau, Germany.

(Continued)

*Primary Examiner* — John Bastianelli
(74) *Attorney, Agent, or Firm* — Oathout Law Firm; Laura Tu; Mark A. Oathout

(57) ABSTRACT

A valve having a valve body comprising a valve stem assembled to the valve body, the valve stem connected to a disc, a gland retainer connected to the valve body, wherein the valve body and the gland retainer define a packing chamber through which the valve stem is assembled, a travel stop connected to the valve stem and retained in the gland retainer, a first o-ring between the valve stem and the travel stop, a second o-ring between the travel stop and the gland retainer, and a third o-ring between the gland retainer and the valve body, and the valve configured for increasing prevention of blow out, increasing service life, increasing safe operation, and preventing overtravel of a valve disc.

28 Claims, 11 Drawing Sheets

(56) References Cited

U.S. PATENT DOCUMENTS

| | | | | |
|---|---|---|---|---|
| 9,033,778 | B2 * | 5/2015 | Jackson | F24F 13/1426<br>137/7 |
| 9,726,295 | B2 * | 8/2017 | Standbridge | F16K 27/067 |
| 2002/0046768 | A1 | 4/2002 | Gonsior | |
| 2002/0108493 | A1 | 8/2002 | Niessen | |

OTHER PUBLICATIONS

Crane Chempharma & Energy, Xomox Brands You Trust Xomox High Performance Butterfly Valve 800ISO, Feb. 15, 2019, 16 pages, Crane ChemPharma & Energy, Cincinnati, Ohio, United States.

Grunfeld, David, PCT International Search Report & Written Opinion for PCT/US2024/043076, Nov. 28, 2024, 13 pages, European Patent Office, The Netherlands.

* cited by examiner

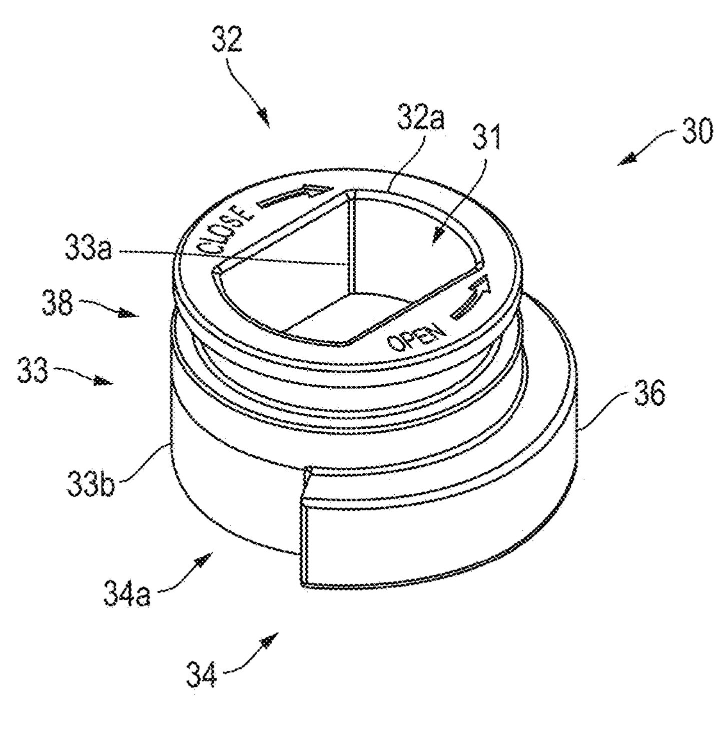
FIG. 3A
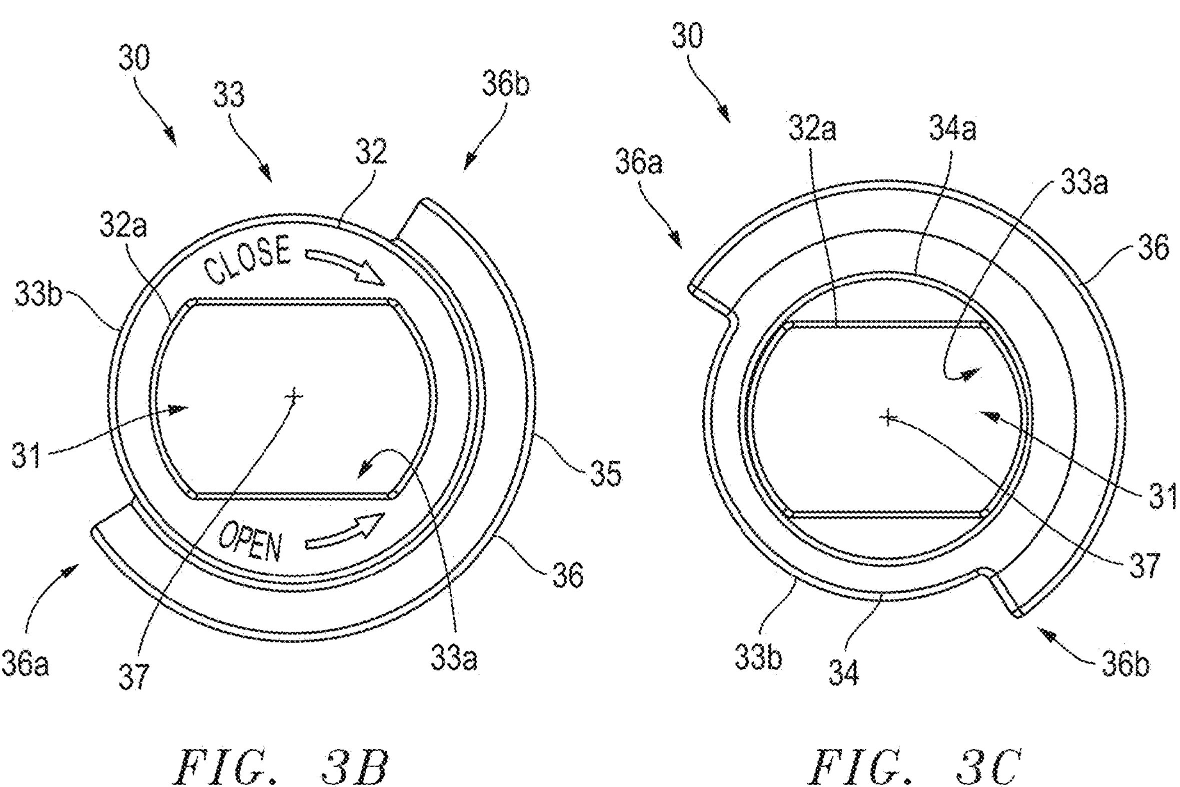
FIG. 3B
FIG. 3C

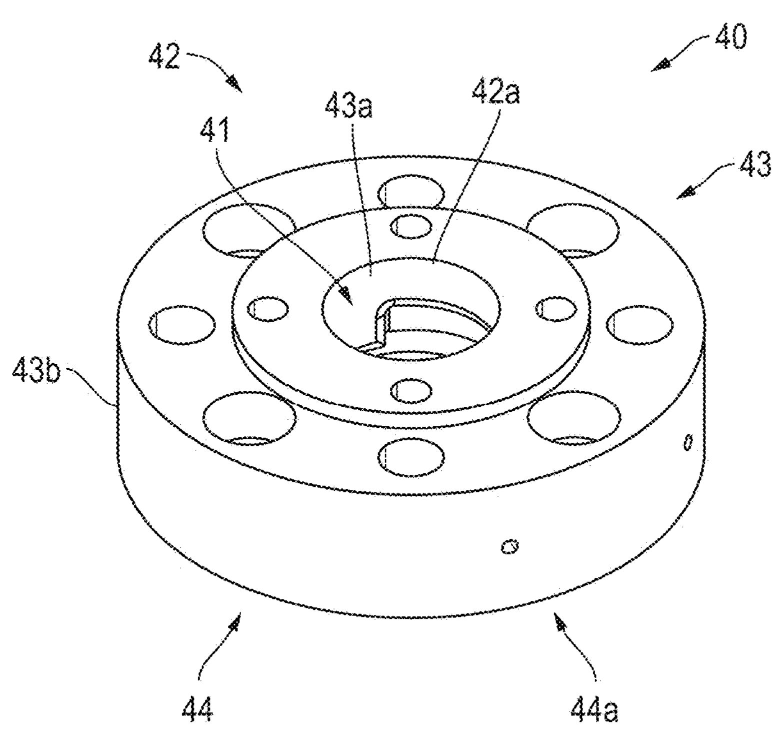
FIG. 5A
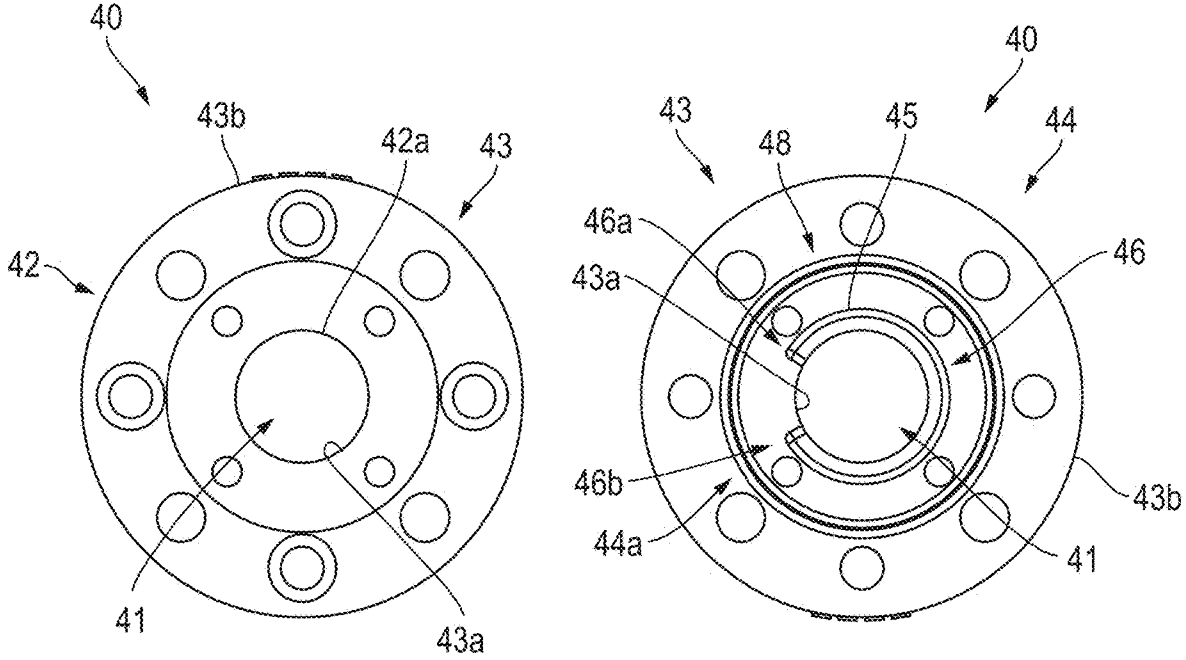
FIG. 5B
FIG. 5C

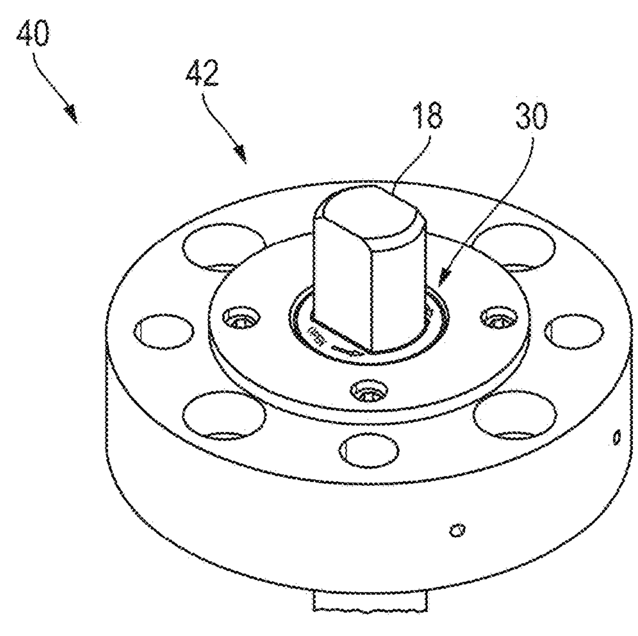
FIG. 7A
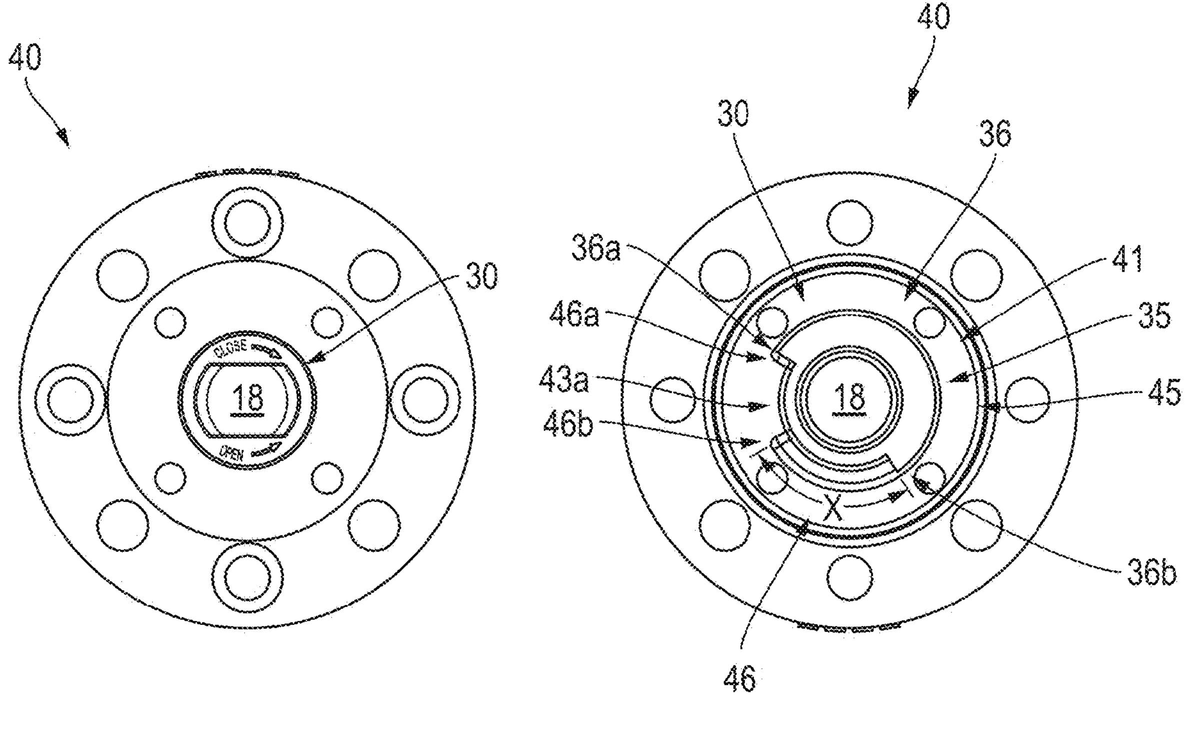
FIG. 7B
FIG. 7C

MULTI-FUNCTIONAL VALVE TRAVEL STOP

CROSS-REFERENCE TO RELATED APPLICATIONS

Not Applicable.

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical field: The subject matter generally relates to improvements for valves, valve assemblies, butterfly valve assemblies, travel stops, and gland retainers, and in particular double offset butterfly valves and valve assemblies.

The geometry of a butterfly valve is well known in the industry. In a butterfly valve, a disc rotates in a flow path to seal the flow path.

In conventional, concentric butterfly valves, as the valve disc moves through its full arc of ninety degrees of rotation, the diametrical axis of the disc will be parallel to the flow axis of the flow path when the valve is fully open, and the diametrical axis of the disc will be precisely perpendicular to the flow axis of the flow path, or flow way, when the valve is fully closed.

In double offset butterfly valves, which may also be referred to as high performance butterfly valves, there exists two offsets as compared to conventional, concentric butterfly valves. The stem is offset from the centerline of seat contact of the valve disc, and the stem is offset from the centerline of the valve.

BRIEF SUMMARY

The present disclosure generally relates to embodiments of a valve travel stop apparatus.

Additionally, the present disclosure relates to embodiments of a gland retainer apparatus.

Additionally, the present disclosure relates to embodiments of rotary valves, quarter turn rotary valves, double offset butterfly valves and butterfly valve assemblies Additionally, the present disclosure relates to embodiments of rotary valves, quarter turn rotary valves, and double offset butterfly valves or butterfly valve assemblies configured to increase prevention of valve stem blow out, increase service life, increase safe operation, and prevent overtravel of a valve disc.

Additionally, the present disclosure related to embodiments of methods of preventing of overtravel of a valve obturator or disc, preventing blow out of a valve stem, increasing service life of a valve, and increasing safe operation of a valve.

A valve having a valve body comprising a valve stem assembled to the valve body, the valve stem connected to a disc, a gland retainer connected to the valve body, wherein the valve body and the gland retainer define a packing chamber through which the valve stem is assembled a travel stop connected to the valve stem and retained in the gland retainer, a first o-ring between the valve stem and the travel stop, a second o-ring between the travel stop and the gland retainer, and a third o-ring between the gland retainer and the valve body, and the valve configured for increasing prevention of blow out, increasing service life, increasing safe operation, and preventing overtravel of a valve disc.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this disclosure, and are not to be considered limiting of its scope, for the disclosure may admit to other equally effective embodiments. The figures are not necessarily to scale and certain features and certain views of the figures may be shown exaggerated in scale or in schematic in the interest of clarity and conciseness.

FIG. 3A depicts an isometric view of an exemplary embodiment of a travel stop.

FIG. 3B depicts a top view of the exemplary embodiment of the travel stop of FIG. 3A.

FIG. 3C depicts a bottom view of the exemplary embodiment of the travel stop of FIG. 3A.

FIG. 5A depicts an isometric view of an exemplary embodiment of a gland retainer.

FIG. 5B depicts a top view of the exemplary embodiment of the gland retainer of FIG. 5A.

FIG. 5C depicts a bottom view of the exemplary embodiment of the gland retainer of FIG. 5A.

FIG. 7A depicts a perspective view of an exemplary embodiment of a travel stop, gland retainer, valve stem, and o-ring assembly.

FIG. 7B depicts a top view of the exemplary embodiment of the travel stop, gland retainer, valve stem, and o-ring assembly of FIG. 7A.

FIG. 7C depicts a bottom view of the exemplary embodiment of the travel stop, gland retainer, valve stem, and o-ring assembly of FIG. 7A.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
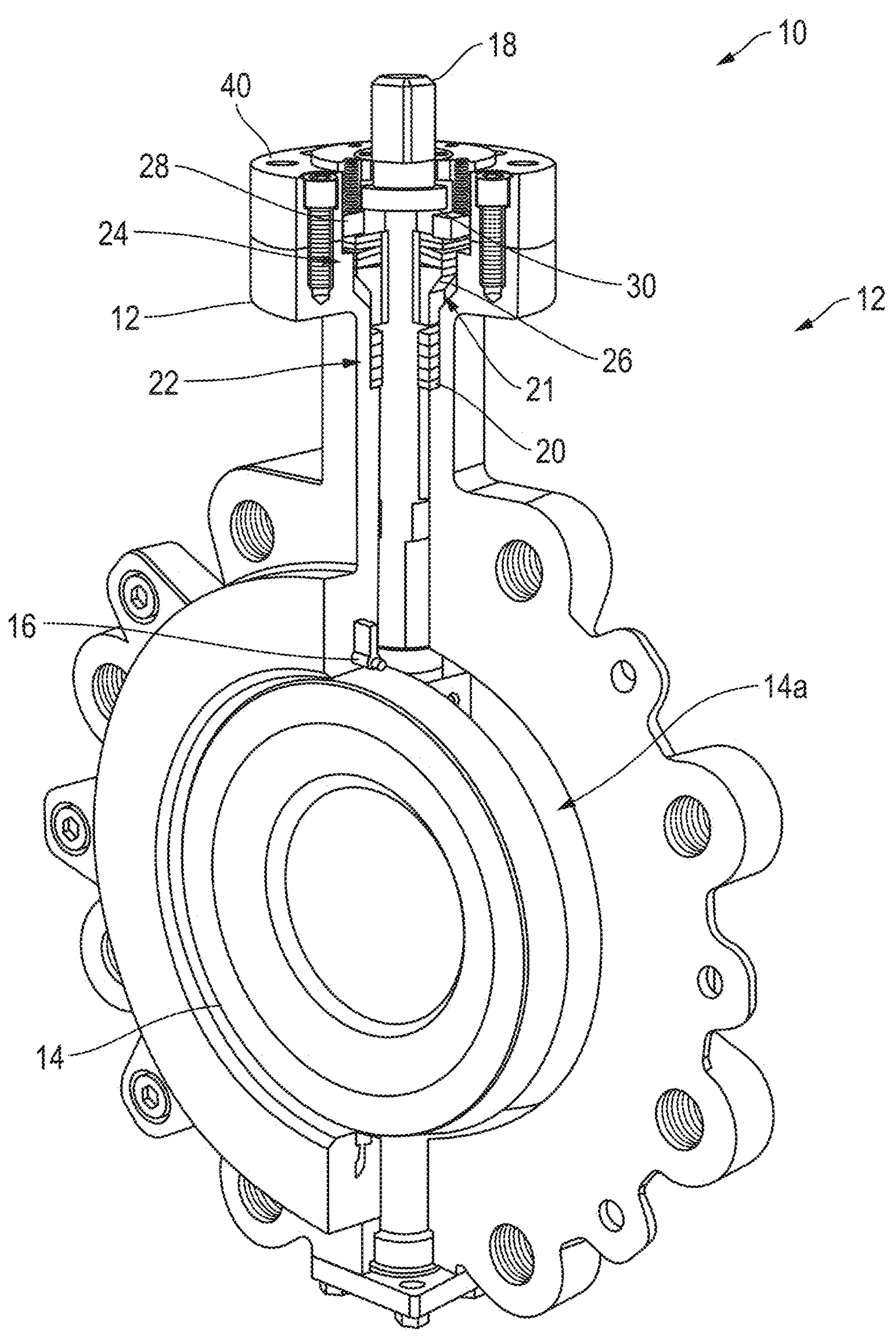
FIG. 1 depicts a perspective, partial quarter section view of an exemplary embodiment of a valve assembly.
Figure 2:
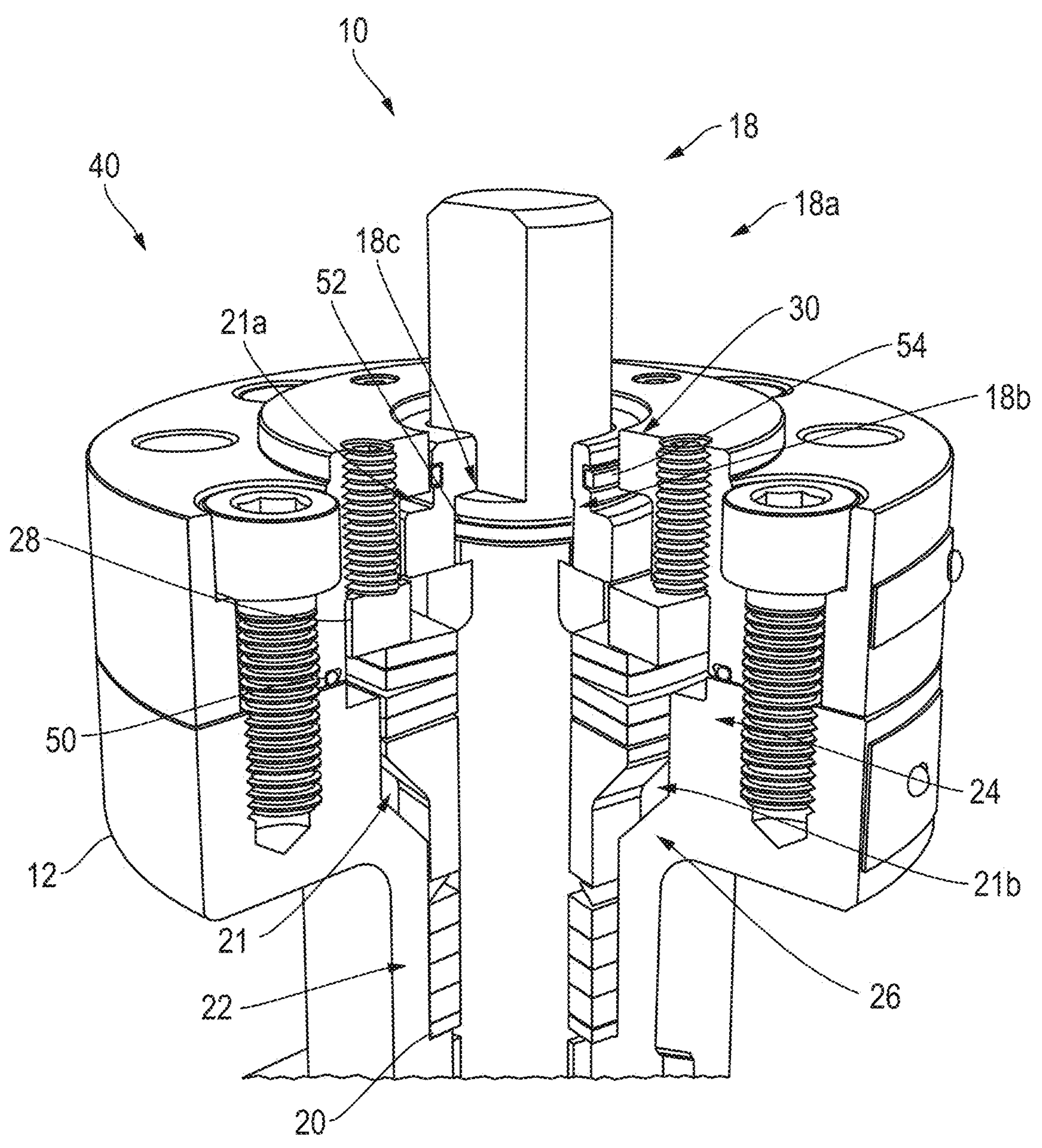
FIG. 2 depicts a perspective, partial quarter section view of an exemplary embodiment of an upper or top region or portion of a valve assembly.
Figure 10:
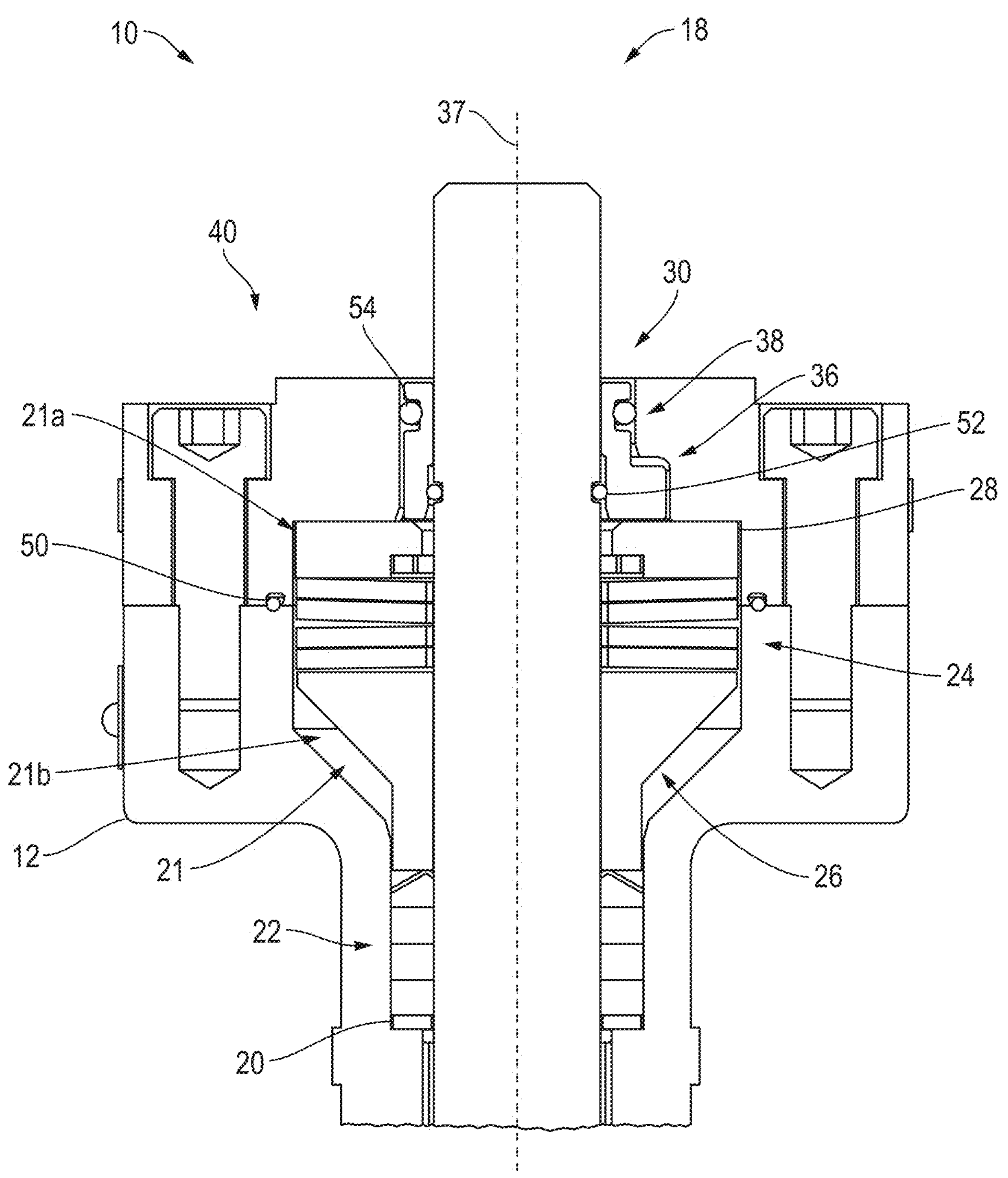
FIG. 10 depicts a cross section view of an exemplary embodiment of an upper or top region or portion of a double offset butterfly valve assembly.

FIG. 1 depicts a perspective, partial quarter section view of an exemplary embodiment of a valve assembly or valve 10. FIG. 2 depicts a perspective, partial quarter section view of an exemplary embodiment of a valve assembly or valve 10. FIG. 10 depicts a cross section view of an exemplary embodiment of an upper or top region or portion of a double offset butterfly valve 10 assembly. Valve 10 is a double offset butterfly valve, which may have a valve body 12, valve obturator or disk or disc 14, and a valve stem 18. Valve 10 may have a valve seat 16. Valve 10 may have a travel stop 30 installed or assembled in, fitted or in connection with, or as housed or retained in the top flange or gland retainer 40 which is mounted to the valve body 12. Valve body 12 may define bore 14*a* through which fluid flows when valve 10 is open. Valve stem 18 may comprise or may have an upper portion 18*a* and a lower portion 18*b*. Stem 18 may comprise stem shoulder 18*c*. By way of example only, the top flange or gland retainer 40 may be mounted to the valve body 12 with bolts or other fasteners. The valve body 12 and gland retainer 40 define a cavity or packing chamber 21 through which the valve stem 18 is assembled the gland retainer 40 defines a first or top portion of the packing chamber 21*a* and the valve body defines a second or bottom portion of the packing chamber 21*b*. Thrust washer 20, packing 22, washers or Belleville washers 24, gland ring 26 and gland washer 28 reside in or are situated in the cavity or packing chamber 21 defined by the valve body 12 and gland retainer 40 and are installed about stem 18. A first seal or o-ring 50 is between gland retainer 40 and valve body 12. A second seal or o-ring 52 is between the valve stem 18 and the travel stop 30. A third seal or o-ring 54 is between travel stop 30 and gland retainer 40. The three seals or o-rings seal the packing chamber 21 from any external environmental ingress, even during operation of the valve 10. The three seals are an improvement over conventional valves which do not feature the seals or o-rings 50, 52, and 54 as described herein. Valve 10 assembly may be described as an open design in that the components, and particularly the travel stop 30 and gland retainer 40, are accessible and removable for installation, maintenance, and/or repair or otherwise servicing of valve 10. Travel stop 30 may be a blow out prevention travel stop and is multi-functional in that the travel stop has features to prevent stem (and stem elements) blowout in addition to preventing overtravel of a disc 14. Valve may comprise a valve stem 18 assembled to the valve body 12, the valve stem 18 connected to a disc 14, a gland retainer 40 connected to the valve body 12, wherein the valve body 12 and the gland retainer 40 define a packing chamber 21 through which the valve stem 18 is mounted, a travel stop 30 connected to the valve stem 18 and retained in the gland retainer 40, a first o-ring 52 between the valve stem 18 and the travel stop 30, a second o-ring 54 between the travel stop and the gland retainer, and a third o-ring 50 between the gland retainer and the valve body, and the valve configured for increasing prevention of blow out of stem 18 (and stem elements), increasing service life, increasing safe operation, and preventing overtravel of a valve disc 14.

FIG. 3A depicts an isometric view of an exemplary embodiment of a travel stop 30. Travel stop 30 comprises a travel stop body 33. The travel stop body 33 may comprise a travel stop body interior surface 33*a*, wherein the travel stop body interior surface 33*a* defines a hole or passage or aperture 31. Passage 31 is configured to integrate with or mate with or be complimentary to or to be assembled around the valve stem 18. Travel stop body 33 may have a travel stop body exterior surface 33*b*. Travel stop body 33 has a first end or top end 32 and a second end or bottom end 34. Passage 31 defined by the travel stop body interior surface 33*a* meets the travel stop body exterior surface 33*b* at the travel stop body top end opening 32*a*. Passage 31 defined by the travel stop body interior surface 33*a* meets the travel stop body exterior surface 33*b* at the travel stop body bottom end opening 34*a*. First end 32 defines a first end or top end opening 32*a* and the second end 34 defines a second end or bottom end opening 34*a*. Travel stop body 33 exterior surface 33*b* defines a recessed groove or recess 38. Recess 38 may be configured to or is shaped to receive a seal or o-ring 54. Recess 38 defined by the travel stop body exterior surface 33*b* may be an annular recess. Travel stop 30 has travel stop shoulder 36. Travel stop shoulder 36 may be integral with or unitary with or unitarily connected or connected to travel stop body 33. Shoulder 36 of travel stop 30 may be semi-annular or an extended arc, projection or protrusion having a first arc length or partial circumference 35 (see, e.g., FIG. 3B). Travel stop shoulder 36 may extend radially outward from the travel stop body 33.

FIG. 3B depicts a top view of the exemplary embodiment of the travel stop 30 of FIG. 3A. Passage 31 defined by the travel stop body interior surface 33*a* meets the travel stop body exterior surface 33*b* at the travel stop body top end opening 32*a*. Top end opening 32*a* and passage 31 are configured to integrate or mate with or connect with valve stem 18 via mating or complementary profiles of the interior surface 33*a* and the outer surface of the stem 18. By way of example only, top end opening 32*a* may have a double D shape that mates with or integrates with a double D valve stem or shaft 18 or a double D portion of a valve stem 18. The double D shape or double D portion of valve stem 18 may also be described as a circular shaft with opposites sides flattened. Other shapes of the mating profiles which key the interior surface 33*a* (and/or opening 32*a*) and outer surface of the stem 18 together, thereby allowing torque or rotational motion to transfer from the stem 18 to the travel stop 30, are possible. Travel stop 30 has travel shoulder 36. Shoulder 36 has a first shoulder end 36*a* and second shoulder end 36*b*. When installed in a butterfly or other rotating valve, travel stop 30 may be turned or rotated clockwise to close the valve from an open position. When installed in a butterfly or other rotating valve, travel stop 30 may be turned or rotated counter-clockwise to open the valve from a closed position. Travel stop 30 and stem 18 have axis of rotation 37 when installed in a valve assembly and rotated (see, e.g. FIG. 8). By way of example only, shoulder 36 of travel stop 30 may have a first arc length or partial circumference 35 which may extend about 204 degrees about rotational axis 37. By way of example only, shoulder 36 of travel stop 30 may have a first arc length or partial circumference 35 which may extend a different number of degrees about rotational axis 37. Shoulder 36 of travel stop 30 may have a first arc length or partial circumference 35 which may extend a number of degrees about rotational axis 37 which is not limited to specific examples set forth in this disclosure.

FIG. 3C depicts a bottom view of the exemplary embodiment of the travel stop 30 of FIG. 3A. Passage 31 defined by the travel stop body interior surface 33*a* meets the travel stop body exterior surface 33*b* at the travel stop body bottom end opening 34*a*. Bottom end opening 34*a* and passage 31 are configured to integrate or connect with or mate with or be assembled around valve stem 18. By way of example only, bottom end opening 34*a* may have a circular shape that integrates with or compliments valve stem or shaft 18. By way of example only, bottom end opening 34*a* may compliment and connect with stem lower portion 18*b*, top end opening 32*a* may compliment and connect with stem upper portion 18*a*, and passage 31 may compliment or connect with stem 18 via stem upper portion 18*a* and stem lower portion 18*b* (see, e.g., FIG. 2).

Figure 4:
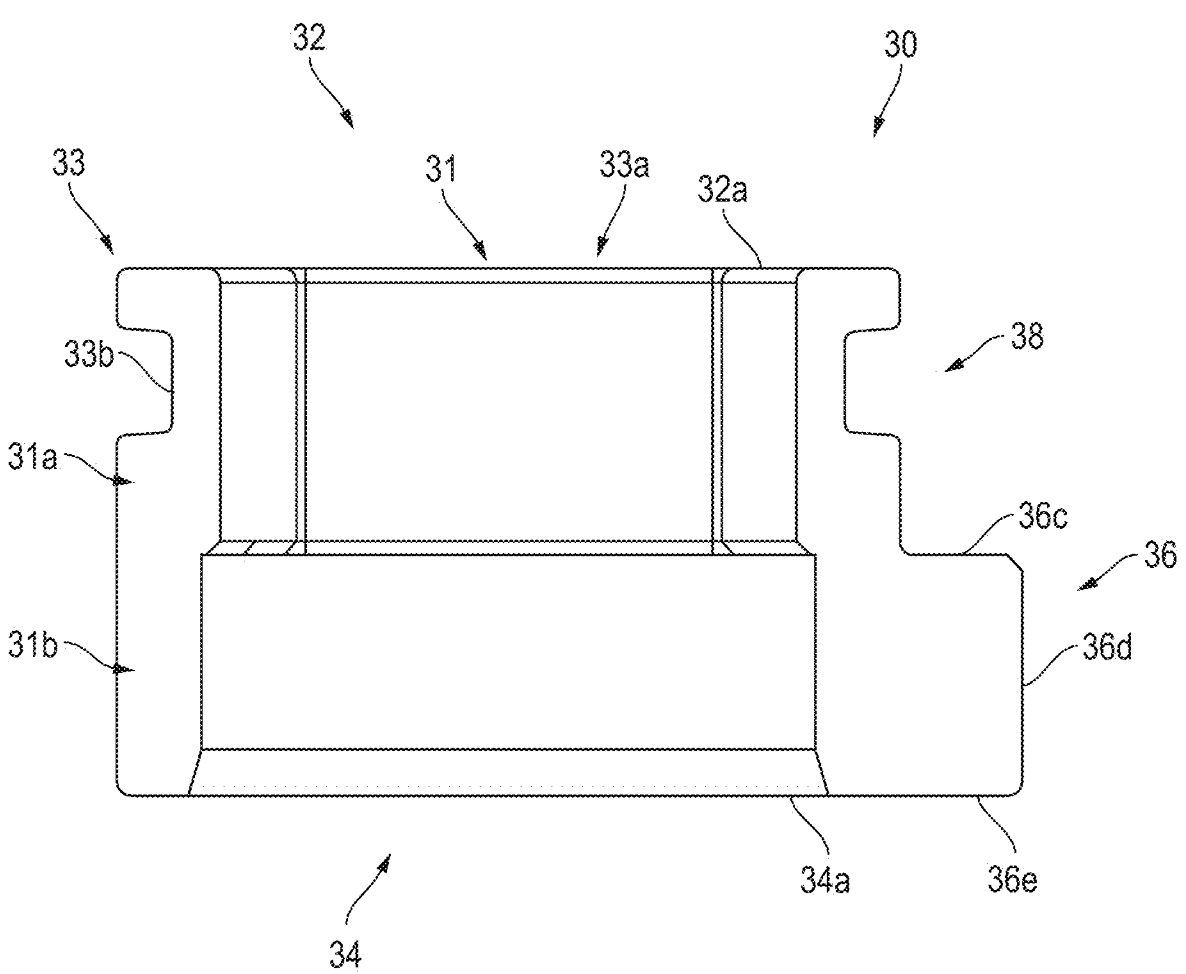
FIG. 4 depicts a side cross section view of the exemplary embodiment of the travel stop of FIG. 3A.

FIG. 4 depicts a side cross section view of the exemplary embodiment of the travel stop 30 of FIG. 3A. Passage 31 may have varying shapes and/or diameters and/or internal diameters defined by the travel stop body interior surface 33*a* as illustrated in FIG. 4, by way of example only. Passage 31 is configured to integrate with or have a mating or complementary interface with valve stem 18. Travel stop shoulder 36 may have a top surface 36*c* connected to a side surface 36*d* connected to a bottom surface 36*e*. By way of example only, the travel stop body interior surface 33*a* may define a top portion 31*a* of passage 31 and bottom portion 31*b* of passage 31. By way of example only, top portion 31*a* of passage 31 may have a smaller diameter than bottom portion 31*b* of passage 31.

FIG. 5A depicts an isometric view of an exemplary embodiment of a gland retainer 40. Gland retainer 40 comprises a gland retainer body 43. Gland retainer body 43 may comprise a gland retainer internal surface 43*a*, wherein the gland retainer body interior surface 43*a* defines a gland retainer body hole or passage or aperture 41. Gland retainer body passage 41 is configured to integrate or connect or mate with, or house, receive or retain, the exemplary embodiment of the travel stop 30 of FIGS. 3A-4. Gland retainer body 43 may have a gland retainer body exterior surface 43*b*. Gland retainer body 43 has a first end or top end 42 and a second end or bottom end 44. Passage 41 defined by the gland retainer body interior surface 43*a* meets the gland retainer body exterior surface 43*b* at the gland retainer body top end opening 42*a*. Passage 41 defined by the gland retainer body interior surface 43*a* meets the gland retainer body exterior surface 43*b* at the gland retainer body bottom end opening 44*a*. First end 42 defines a first end or top end opening 42*a* and the second end 44 defines a second end or bottom end opening 44*a*.

FIG. 5B depicts a top view of the exemplary embodiment of the gland retainer 40 of FIG. 5A. Passage 41 defined by the gland retainer body interior surface 43*a* meets the gland retainer body exterior surface 43*b* at the gland retainer body top end opening 42*a*. By way of example only, gland retainer body top end opening 42*a* may be circular. Gland retainer body top end opening 42*a* and passage 41 are configured to integrate or connect or mate with, or house, receive, or retain the exemplary embodiment of the travel stop 30 of FIGS. 3A-4. The diameter of the gland retainer body top opening 42*a* may be a complementary or mating shape or size to the top end 32 of the travel stop 30, yet have a smaller diameter than the travel stop shoulder 36 to aid in retaining the travel stop 30 against the stem 18 (shown, e.g., in FIGS. 1-2 & 10) and stem elements, such as, by way of example, the gland washer 28.

FIG. 5C depicts a bottom view of the exemplary embodiment of the gland retainer 40 of FIG. 5A. Gland retainer body 43 has a second end or bottom end 44. Second end or bottom end 44 of gland retainer 40 defines a bottom end or second end opening 44*a*. Passage 41 defined by the gland retainer body interior surface 43*a* meets the gland retainer body exterior surface 43*b* at the gland retainer body bottom end opening 44*a*. By way of example only, gland retainer body bottom end opening 44*a* may be circular. Gland retainer body bottom end opening 44*a* may have a larger diameter than gland retainer body top end opening 43*a*. Gland retainer bottom end 44 defines an annular recessed groove or recess 48 for receiving a seal or o-ring 50 (shown in FIGS. 1, 2, and 10). Gland retainer body passage 41 defined by the gland retainer interior surface 43*a* comprises or defines a travel stop shoulder recess portion 46, which may be an arc-shaped recess having a second arc length or partial circumference 45. Second arc length or partial circumference 45 of travel stop shoulder recess portion 46 may be greater than the first arc length or partial circumference 35 of the travel stop shoulder 36. By way of example only, travel stop shoulder recess portion 46 of gland retainer 40 may have a second arc length or partial circumference 45 which may extend about 300 degrees about rotational axis 37. By way of example only, travel stop shoulder recess portion 46 of gland retainer 40 may have a second arc length or partial circumference 45 which may extend a different number of degrees about rotational axis 37. Travel stop shoulder recess portion 46 of gland retainer 40 may have a second arc length or partial circumference 45 which may extend a number of degrees about rotational axis 37 which is not limited to specific examples set forth in this disclosure. As travel stop shoulder 36 is inserted into or retained or housed in the recess 46 during assembly, the length or amount of difference X between the lengths or degrees 35 and 45 defines or allows a limited range of rotational motion of the travel stop 30 and the stem 18. By way of example only, the difference X may allow 96 degrees of rotational space about axis of rotation 37. By way of example only, the difference X may allow 90 degrees of rotational space about axis of rotation 37 depending on the first arc length 35 of travel shoulder 36 and the second arc length 45 of travel stop shoulder recess portion 46. By way of example, the difference X may be varied. The difference X is not limited to specific examples set forth in this disclosure. By way of example only, arc length or degrees 35 of travel stop shoulder 36, arc length or degrees 45 of travel stop shoulder recess portion 46 of gland retainer 40, and the difference X may vary; such may vary or be varied based on the size of the valve, the type of valve, the seat position, orientation, and/or seat type, and/or may vary or be varied to optimize flow control including in the open and closed position of the valve. Travel stop shoulder recess portion 46 has a first recess end 46*a* and a second recess end 46*b*. Gland retainer body bottom end opening 44*a* and passage 41 are configured to integrate or connect or mate with or house or retain the exemplary embodiment of the travel stop 30 of FIGS. 3A-4.

Figure 6:
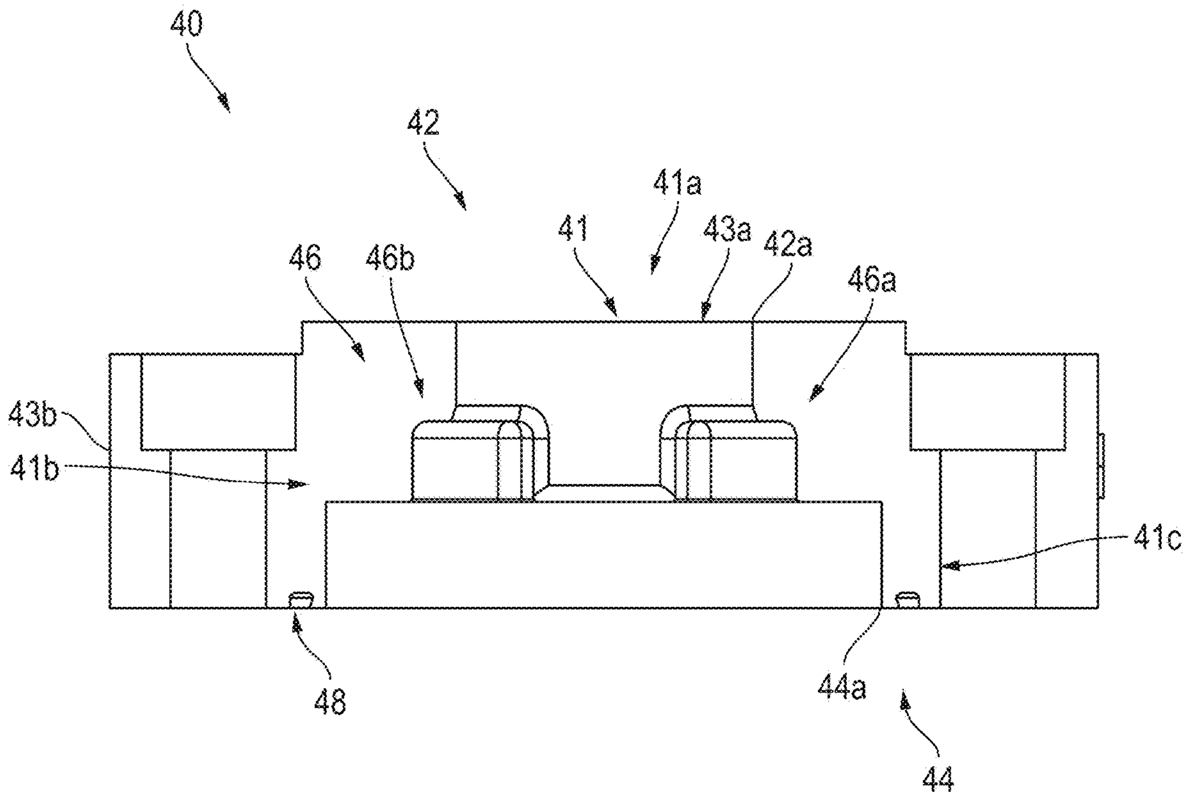
FIG. 6 depicts a side cross section view of the exemplary embodiment of the gland retainer of FIG. 5A.

FIG. 6 depicts a side cross section view of the exemplary embodiment of the gland retainer of FIG. 5A. Gland retainer body passage 41 is configured to integrate or connect or mate with or compliment the exemplary embodiment of the travel stop 30 of FIGS. 3A-4. Gland retainer body passage 41 may have varying shapes and/or diameters and/or internal diameters defined by the gland retainer body interior surface 43*a* as illustrated in FIG. 6, by way of example only. By way of example only, the gland retainer body interior surface 43*a* may define a top portion 41*a* of passage 41, middle portion 41*b* of passage 41, and bottom portion 41*c* of passage 41. By way of example only, top portion 41*a* of passage 41 may have a smaller diameter than bottom portion 41*c* of passage 41*c*.

FIG. 7A depicts a perspective view of an exemplary embodiment of a travel stop 30, gland retainer 40, valve stem 18, and o-ring assembly. FIG. 7B depicts a top view of the exemplary embodiment of the travel stop 30, gland retainer 40, valve stem 18, and o-ring assembly of FIG. 7A. FIG. 7C depicts a bottom view of the exemplary embodiment of the travel stop, gland retainer, valve stem, and o-ring assembly of FIG. 7A. Referring to FIGS. 7A-7C, travel stop 30 is installed about stem 18. Gland retainer is installed about the travel stop 30 and stem 18. Travel stop 30 may rotate clockwise or counterclockwise when stem 18 is rotated or actuated. As viewed from the top, when looking at gland retainer body top end 42, travel stop 30 may be turned or rotated clockwise to close the valve from an open or semi open position. As viewed from the top, when looking at gland retainer body top end 42, travel stop 30 may be turned or rotated counter-clockwise to open the valve from a closed position. Gland retainer body passage 41 as defined by the gland retainer interior surface 43*a* comprises a travel stop shoulder recess portion 46. Travel stop shoulder recess portion 46 has a first recess end 46*a* and a second recess end 46*b*. Travel stop 30 has travel shoulder 36. Travel shoulder 36 has a first shoulder end 36*a* and second shoulder end 36*b*. Travel stop shoulder 36 rotates within the travel stop shoulder recess portion 46 of gland retainer 40, as the gland retainer 40 and recess portion 46 remains stationary and fixed or mounted to the valve body 12. When the travel stop first shoulder end 36*a* abuts the first recess end 46*a* of the travel stop shoulder recess portion 46, the valve is in a closed position. When the travel stop second shoulder end 36*b* abuts the second recess end 46*b* of the travel stop shoulder recess portion 46, the valve is in an open position. Arc length or partial circumference 45 of travel stop shoulder recess portion 46 may be greater than the first arc length or partial circumference 35 of the travel stop shoulder 36. The length or amount of difference X between the first arc length or degrees 35 of travel stop shoulder 36 and the second arc length of degrees 45 of the travel stop shoulder recess portion 46 allows a limited range of rotational motion of the travel stop 30 and the stem 18.

Figure 8:
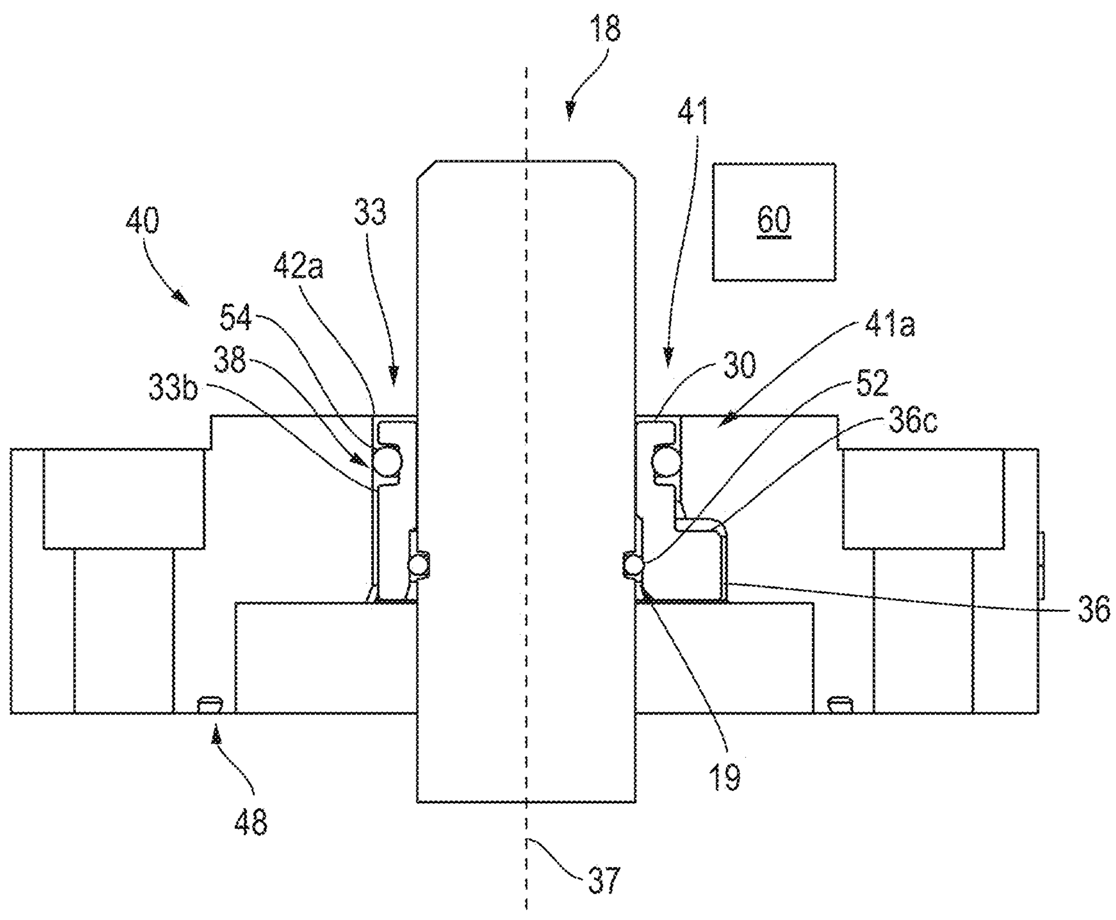
FIG. 8 depicts a side cross section view of the exemplary embodiment of the travel stop, gland retainer, valve stem, and o-ring assembly of FIG. 7A.

FIG. 8 depicts a side cross section view of the exemplary embodiment of the travel stop 30, gland retainer 40, valve stem 18, and o-ring assembly of FIG. 7A. Valve stem 18 defines a recessed groove or recess 19 configured to or shaped to receive seal or o-ring 52. O-ring 52 is situated between the valve stem 18 and the travel stop 30. Gland retainer bottom end 44 defines a recessed groove or recess 48 configured to or shaped to receive seal or o-ring 50 (shown in FIGS. 1, 2, & 10). Travel stop body 33 exterior surface 33*b* defines a recessed groove or recess 38 configured to or shaped to receive seal or o-ring 54. O-ring 54 is situated between the travel stop 30 and the gland retainer 40. The plurality of o-rings 50, 52, 54 seal the packing chamber from the external environment 60 (shown schematically). Travel stop 30 and stem 18 have an have axis of rotation 37 when installed in a valve and rotated. Blow out of the valve stem (and stem elements) is prevented due to the top surface 36*c* of the travel stop shoulder 36 and the travel stop shoulder 36 being retained or installed in the travel stop shoulder recess portion 46 of gland retainer 40, where the travel stop shoulder 36 cannot pass out of the top end of the gland retainer body 43 of gland retainer 40 due to the smaller diameter and different shape of the gland retainer top end opening 42*a* and top portion 41*a* of passage 41. The travel stop 30 offers increased shear area to withstand higher torque loads, which is an improvement over conventional valves that may use a pin. The travel stop 30, as retained by the gland retainer 40 in a valve assembly, allows for an uninterrupted bore 14*a* (shown in FIG. 1) by optimizing the flow path through bore 14*a* of the valve 10 and reducing potential turbulence as compared to conventional valves which have a travel stop located within the bore 14*a* of the valve 10, obstructing flow.

Figure 9A:
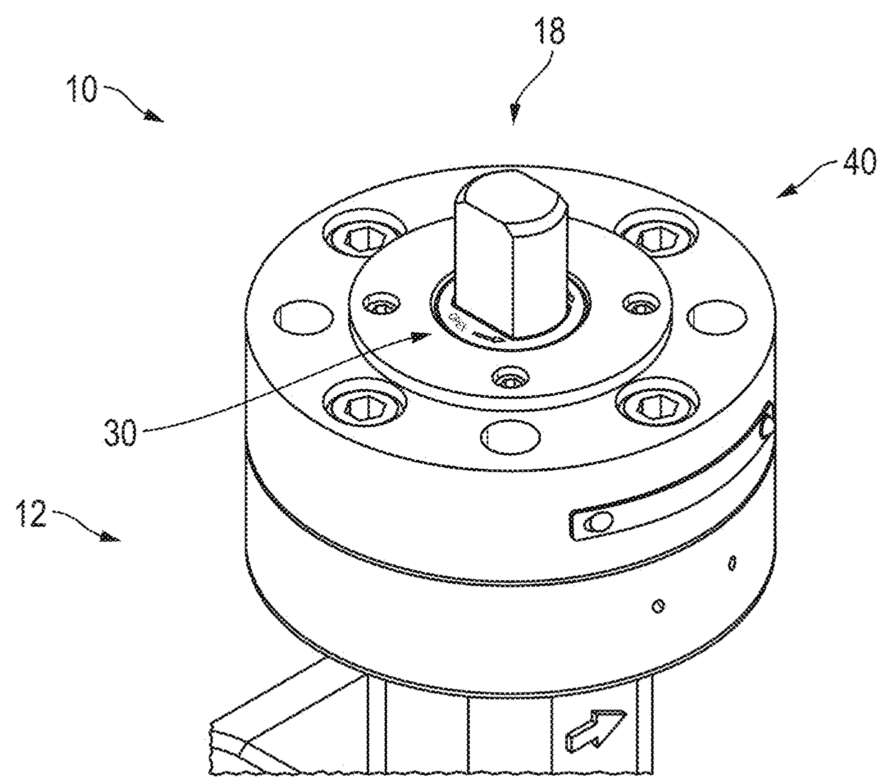
FIG. 9A depicts an isometric view of an exemplary embodiment of an upper or top region or portion of a double offset butterfly valve assembly.
Figure 9B:
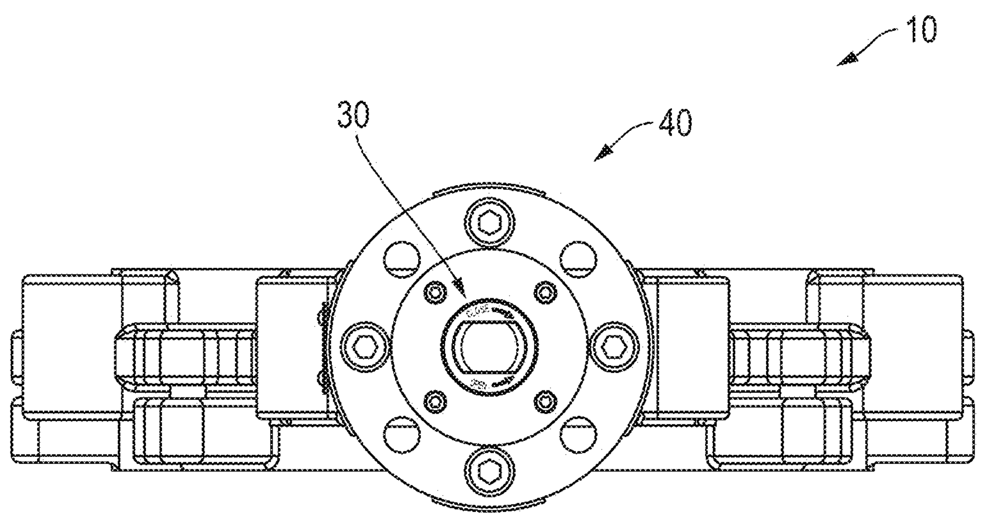
FIG. 9B depicts a top view of the exemplary embodiment of the double offset butterfly valve assembly of FIG. 9A.

FIG. 9A depicts an isometric view of an exemplary embodiment of an upper or top region or portion of a double offset butterfly valve 10 assembly. FIG. 9B depicts a top view of the exemplary embodiment of the double offset butterfly valve 10 assembly of FIG. 9A. Referring to FIGS. 9A-9B, travel stop 30 is installed about stem 18. Gland retainer 40 is installed about travel stop 30 and bolted to valve body 12.

FIG. 10 depicts a cross section view of an exemplary embodiment of an upper or top region or portion of a double offset butterfly valve 10 assembly. Valve 10 has travel stop 30 installed into the top flange or gland retainer 40 which is mounted to the valve body 12 by bolts. The valve body 12 and gland retainer 40 define a cavity or packing chamber 21 through which the valve stem 18 is assembled or mounted. Thrust washer 20, packing 22, washers or Belleville washers 24, gland ring 26 and gland washer 28 reside in or are situated in the cavity defined by the valve body 12 and gland retainer 40 and are installed about stem 18. Seal or o-ring 50 is between gland retainer 40 and valve body 12. Seal or o-ring 52 is between the valve stem 18 and the travel stop 30. Seal or o-ring 54 is between travel stop 30 and gland retainer 40. The gland retainer 40 defines a first or top portion of the packing chamber 21*a* and the valve body defines a second or bottom portion of the packing chamber 21*b*. Travel stop 30 and stem 18 have axis of rotation 37 when installed in a valve assembly and rotated. By way of example only, in another embodiment, seal or o-ring 54 between travel stop 30 and gland retainer 40 may be in a recess configured to or shaped to receive o-ring 54 defined by gland retainer 40 or interior surface of gland retainer 40. By way of example only, in another embodiment, seal or o-ring 52 between valve stem 18 and travel stop 30 may be in a recess configured to or shaped to receive o-ring 52 defined by travel stop 30 or interior surface of travel stop 30. By way of example only, in another embodiment, seal or o-ring 50 between gland retainer 40 and valve body 12 may be in a recess configured to or shaped to receive o-ring 50 defined by the valve body 12. By way of example only, in another embodiment, at least one o-ring 50, 52, 54 of the shown o-ring assembly may be in a recess configured to or shaped to receive an o-ring defined by the complimentary or mating valve component opposite of and instead of those shown in FIG. 10. By way of example only, stem elements shown in FIG. 10, e.g., thrust washer 20, packing 22, washers or Belleville washers 24, gland ring 26 and gland washer 28 reside in or are situated in the cavity defined by the valve body 12 may vary in number or type of element.

Figure 11:
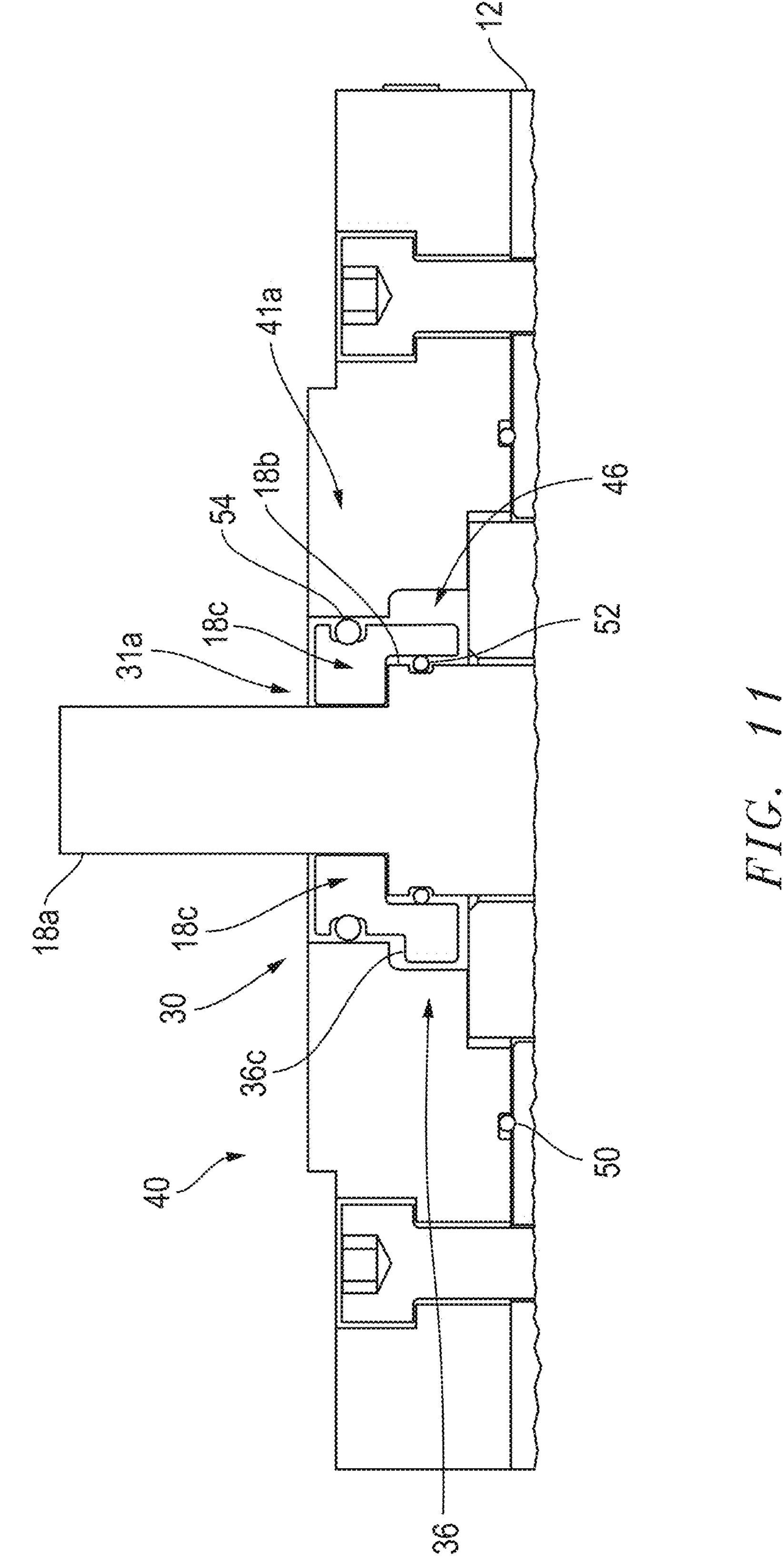
FIG. 11 depicts a cross section view of an exemplary embodiment of an upper or top region or portion of a double offset butterfly valve 10 assembly.

FIG. 11 depicts a cross section view of an exemplary embodiment of an upper or top region or portion of a double offset butterfly valve 10 assembly. Valve 10 may have a travel stop 30 installed or assembled in, fitted or in connection with, or as housed or retained in the top flange or gland retainer 40 which is mounted to the valve body 12. Valve body 12 may define bore 14*a* (shown in FIG. 1) through which fluid flows when valve 10 is open. Valve stem 18 may have an upper portion 18*a* and a lower portion 18*b*. Seal or o-ring 50 is between gland retainer 40 and valve body 12. Seal or o-ring 52 is between the valve stem 18 and the travel stop 30. Seal or o-ring 54 is between travel stop 30 and gland retainer 40. Referring to FIGS. 2, 3A-3C, 8, and 11, top end opening 32*a* and passage 31 are configured to integrate or mate with or connect with valve stem 18 via mating or complementary profiles of the interior surface 33*a* and the outer surface of the stem 18. By way of example only, top end opening 32*a* may have a double D shape that mates with or integrates with or connects with a double D valve stem or shaft 18 or a double D portion of a valve stem 18. The double D shape or double D portion of valve stem 18 may also be described as a circular shaft with opposites sides flattened. Bottom end opening 34*a* and passage 31 are configured to integrate or mate with or connect with valve stem 18 via mating or complementary profiles of the interior surface 33*a* and the outer surface of stem 18. By way of example only, valve stem upper portion 18*a* may have a double D shape and valve stem lower portion 18*b* may have a circular shape. Stem 18 may have stem shoulder 18*c* proximate where stem upper portion 18*a* and stem lower portion 18*b* meet. Stem lower portion 18*b* may have a larger diameter and different shape than stem upper portion 18*a*. Other shapes of the mating profiles which key the interior surface 33*a* (and/or opening 32*a*) of travel stop 30 and outer surface of the stem 18 together, thereby allowing torque or rotational motion to transfer from the stem 18 to the travel stop 30, are possible. By way of example only, stem 18 may comprise a key and upper portion of stem 18*a* may have a substantially circular shape and key shape. By way of example only, upper portion of stem 18*a* may have a square shape. By way of example only, different shapes of stem 18 and methods of driving stem 18 thereby allowing torque or rotational motion to transfer from the stem 18 to the travel stop 30 are possible, such as and not limited to a key drive or a square drive. By way of example only, FIGS. 2, 8, & 11 show valve stem 18 upper portion 18*a* having a double D shape and valve stem lower portion 18*b* having a circular shape. Referring to FIGS. 2 & 11, stem 18 may have or may comprise stem shoulder 18*c*. Blow out of the valve stem 18 (and stem elements) is prevented due to the stem shoulder 18*c* and stem lower portion 18*b* being retained or installed in the travel stop 30 where stem shoulder 18*c* and stem lower portion 18*b* cannot pass out of or pass through the top end 32 of the travel stop body 33 of travel stop 30 due to the smaller diameter and different shape of the travel stop top end opening 32*a* and top portion 31*a* of passage 31. Blow out of the valve stem 18 (and stem elements) is prevented due to the top surface 36*c* of the travel stop shoulder 36 and the travel stop shoulder 36 being retained or installed in the travel stop shoulder recess portion 46 of gland retainer 40, where the travel stop shoulder 36 cannot pass out of the top end of the gland retainer body 43 of the gland 40 due to the smaller diameter and different shape of the gland retainer top end opening 42*a* and top portion 41*a* of passage 41. Travel stop 30 is multi-functional in that the travel stop 30 is integrated as stem (and stem elements) blow out prevention in addition to preventing overtravel of disc 14. By way of example only, stem 18 is physically unable to pass through or out of the top of travel stop 30. By way of example only, travel stop 30 is physically unable to pass through or out of the top of gland retainer 40. By way of example only, stem 18 is physically unable to pass through or out of the top of gland retainer 40.

While the exemplary embodiments are described with reference to various implementations and exploitations, it will be understood that these exemplary embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A travel stop apparatus for a valve comprising:
- a travel stop body, wherein the travel stop body comprises:
  - a travel stop body interior surface, wherein the travel stop body interior surface defines a passage, and wherein the passage is configured to connect with a valve stem;
  - a travel stop body exterior surface;
  - a travel stop body top end, wherein the passage defined by the travel stop body interior surface meets the travel stop body exterior surface at a travel stop body top end opening and wherein the travel stop body top end opening is keyed to transfer rotational motion from the valve stem; and
  - a travel stop body bottom end, wherein the passage defined by the travel stop body interior surface meets the travel stop body exterior surface at a travel stop body bottom end opening and wherein the travel stop body bottom end opening is a circular opening of a larger diameter than the travel stop body top end opening;
- a travel stop shoulder connected to the travel stop body, wherein the travel stop shoulder is semi annular and extends radially outward from the travel stop body;
- wherein travel stop body exterior surface defines a first annular recess for receiving a first o-ring; and
- wherein the travel stop body interior surface defines a second annular recess for receiving a second o-ring.

2. The apparatus according to claim 1, wherein the travel stop shoulder is unitarily connected to the travel stop body.

3. The apparatus according to claim 1, wherein the exterior surface of the travel stop body is configured to connect with a gland retainer.

4. The apparatus according to claim 1, wherein the travel stop shoulder further comprises a first shoulder end and a second shoulder end.

5. The apparatus according to claim 4, wherein the travel stop shoulder has an arc length.

6. A gland retainer apparatus for a valve comprising:
- a gland retainer body, wherein the gland retainer body comprises:
  - a gland retainer body interior surface, wherein the gland retainer body interior surface defines a gland retainer body passage and wherein the gland retainer body passage is configured to connect with the travel stop apparatus of claim 1;
- a gland retainer body exterior surface;
  - a gland retainer body top end, wherein the gland retainer body passage defined by the gland retainer body interior surface meets the gland retainer body exterior surface at a gland retainer body top end opening; and
  - a gland retainer body bottom end, wherein the gland retainer body passage defined by the gland retainer body interior surface meets the gland retainer body exterior surface at a gland retainer body bottom end opening; and
  - wherein the gland retainer body bottom end opening defines a larger diameter than the gland retainer top end opening.

7. The apparatus according to claim 6, wherein the gland retainer body passage defined by the gland retainer interior surface comprises a travel stop shoulder recess portion.

8. The apparatus according to claim 7, wherein the travel stop shoulder recess portion comprises a first recess end and a second recess end.

9. The apparatus according to claim 8, wherein the gland retainer bottom end defines a recess for receiving a third o-ring.

10. A valve having a valve body comprising:

a valve stem assembled to the valve body;

wherein the valve stem is connected to a disc, and further wherein the valve stem defines a stem shoulder between an upper portion of the valve stem and a lower portion of the valve stem;

a gland retainer connected to the valve body, wherein the valve body and the gland retainer define a packing chamber through which the valve stem is assembled;

a travel stop connected to the valve stem and retained in the gland retainer, wherein the travel stop defines a travel stop shoulder;

and wherein the gland retainer retains the travel stop shoulder of the travel stop against the valve, and wherein the travel stop retains the stem shoulder against the valve.

11. The apparatus of claim 10, further comprising:

a plurality of o-rings which seal the packing chamber from the external environment.

12. The apparatus of claim 10, further comprising:

a first o-ring between the valve stem and the travel stop;

a second o-ring between the travel stop and the gland retainer; and a third o-ring between the gland retainer and the valve body.

13. The apparatus of claim 12, wherein the travel stop comprises a travel stop body, wherein the travel stop body comprises:

a travel stop body interior surface, wherein the travel stop body interior surface defines a passage, and wherein the passage is configured to connect with the valve stem;

a travel stop body exterior surface;

a travel stop body top end, wherein the passage defined by the travel stop body interior surface meets the travel stop body exterior surface at a travel stop body top end opening; and a travel stop body bottom end, wherein the passage defined by the travel stop body interior surface meets the travel stop body exterior surface at a travel stop body bottom end opening.

14. The apparatus of claim 13, wherein the stem shoulder and the lower portion of the valve stem cannot pass through the top end of the travel stop body.

15. The apparatus of claim 13, wherein the gland retainer comprises a gland retainer body, wherein the gland retainer body comprises:

a gland retainer body interior surface, wherein the gland retainer body interior surface defines a gland retainer body passage and wherein the gland retainer body passage is configured to connect with the travel stop;

a gland retainer body exterior surface;

a gland retainer body top end, wherein the gland retainer body passage defined by the gland retainer body interior surface meets the gland retainer body exterior surface at a gland retainer body top end opening; and a gland retainer body bottom end, wherein the gland retainer body passage defined by the gland retainer body interior surface meets the gland retainer body exterior surface at a gland retainer body bottom end opening.

16. The apparatus of claim 14, wherein the travel stop shoulder cannot pass through the top end of the gland retainer body.

17. A method of preventing over travel of a valve disk comprising the steps of:

providing a travel stop apparatus, wherein the travel stop apparatus comprises a travel stop shoulder, about a stem of a valve;

providing a gland retainer installed around the stem of the valve and connected to the travel stop apparatus about the stem of the valve;

rotating the travel stop apparatus:

preventing pass through of a stem shoulder through a top end opening of the travel stop apparatus; and preventing pass through of the travel stop shoulder through a gland retainer top end opening.

18. The method of claim 17, further comprising the steps of:

preventing blow out of the stem of the valve.

19. The method of claim 17, further comprising the steps of:

sealing a packing chamber of the valve with a plurality of o-rings.

20. The method of claim 19, wherein the step of rotating the travel stop apparatus comprises the step of actuating the stem of the valve in a clockwise direction.

21. The method of claim 19, wherein the step of rotating the travel stop apparatus comprises the step of actuating the stem of the valve in a counterclockwise direction.

22. The method of claim 20, wherein the travel stop shoulder comprises a first shoulder end and a second shoulder end; and the gland retainer comprises:

a gland retainer body, wherein the gland retainer body comprises:

a gland retainer body interior surface, wherein the gland retainer body interior surface defines a gland retainer body passage, wherein the gland retainer body passage defined by the gland retainer interior surface comprises a travel stop shoulder recess portion wherein the travel stop shoulder recess portion comprises a first recess end and a second recess end;

a gland retainer body exterior surface;

a gland retainer body top end, wherein the gland retainer body passage defined by the gland retainer body interior surface meets the gland retainer body exterior surface at the gland retainer body top end opening; and a gland retainer body bottom end, wherein the gland retainer body passage defined by the gland retainer body interior surface meets the gland retainer body exterior surface at a gland retainer body bottom end opening.

23. The method of claim 21, wherein the travel stop shoulder comprises a first shoulder end and a second shoulder end; and the gland retainer comprises:

a gland retainer body, wherein the gland retainer body comprises:

a gland retainer body interior surface, wherein the gland retainer body interior surface defines a gland retainer body passage, wherein the gland retainer body passage defined by the gland retainer interior surface comprises a travel stop shoulder recess portion wherein the travel stop shoulder recess portion comprises a first recess end and a second recess end;

a gland retainer body exterior surface;

a gland retainer body top end, wherein the gland retainer body passage defined by the gland retainer body interior surface meets the gland retainer body exterior surface at the gland retainer body top end opening; and a gland retainer body bottom end, wherein the gland retainer body passage defined by the gland retainer body interior surface meets the gland retainer body exterior surface at a gland retainer body bottom end opening.

24. A method of preventing over travel of a valve obturator comprising the steps of:

providing a travel stop apparatus, wherein the travel stop apparatus comprises a travel stop shoulder, about a stem of a valve;

providing a gland retainer installed around the stem of the valve and connected to the travel stop apparatus about the stem of the valve; and rotating the travel stop apparatus;

retaining a stem shoulder of the stem against the valve via the travel stop apparatus, wherein the stem shoulder is between an upper stem portion and a lower stem portion;

retaining the travel stop shoulder against the valve via a travel stop recess portion defined in the gland retainer;

sealing between the gland retainer and the travel stop apparatus; and sealing between the travel stop apparatus and the stem.

25. The method of claim 24, further comprising the step of preventing blow out of the stem of the valve.

26. The method of claim 25, wherein the travel stop shoulder comprises a first end and a second end, and wherein the gland retainer comprises a gland retainer body, wherein the gland retainer body comprises a gland retainer body interior surface, wherein the gland retainer body interior surface defines a gland retainer body passage, wherein the gland retainer body passage defined by the gland retainer interior surface comprises the travel stop shoulder recess portion wherein the travel stop shoulder recess portion comprises a first recess end and a second recess end.

27. The method of claim 26, wherein the step of rotating the travel stop apparatus further comprises the step of abutting the second end of the travel stop shoulder to the second recess end of the travel stop shoulder recess portion.

28. The method of claim 27, wherein the step of rotating the travel stop apparatus further comprises the step of abutting the first end of the travel stop shoulder to the first recess end of the travel stop shoulder recess portion.

* * * * *